(12) United States Patent
Joo et al.

(10) Patent No.: US 9,729,763 B2
(45) Date of Patent: Aug. 8, 2017

(54) RECEIVING APPARATUS AND RECEIVING METHOD THEREOF

(75) Inventors: Yu-sung Joo, Yongin-si (KR);
Dae-jong Lee, Hwaseong-si (KR);
Hee-jean Kim, Yongin-si (KR);
Jae-jun Lee, Suwon-si (KR);
Yong-seok Jang, Hwaseong-si (KR);
Hong-seok Park, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 496 days.

(21) Appl. No.: 14/238,645

(22) PCT Filed: Aug. 13, 2012

(86) PCT No.: PCT/KR2012/006455
§ 371 (c)(1),
(2), (4) Date: Feb. 12, 2014

(87) PCT Pub. No.: WO2013/025032
PCT Pub. Date: Feb. 21, 2013

(65) Prior Publication Data
US 2014/0176795 A1    Jun. 26, 2014

Related U.S. Application Data

(60) Provisional application No. 61/522,906, filed on Aug. 12, 2011.

(30) Foreign Application Priority Data

Aug. 13, 2012  (KR) .......................... 10-2012-0088488

(51) Int. Cl.
*H04N 5/04*     (2006.01)
*H04H 20/18*    (2008.01)
(Continued)

(52) U.S. Cl.
CPC .............. *H04N 5/04* (2013.01); *H04H 20/18* (2013.01); *H04N 21/242* (2013.01);
(Continued)

(58) Field of Classification Search
CPC .. H04H 20/18; H04N 21/242; H04N 21/4307; H04N 21/4622; H04N 21/6125; H04N 21/631; H04N 5/04
(Continued)

(56) References Cited

U.S. PATENT DOCUMENTS 6,272,132 B1 * 8/2001 Ofek ................... H04L 12/6418
370/389
2002/0034252 A1 * 3/2002 Owen .................. H04N 19/523
375/240.17
(Continued)

FOREIGN PATENT DOCUMENTS

CN          101151902 A     3/2008
CN          101453662 A     6/2009
(Continued)

OTHER PUBLICATIONS

International Search Report (PCT/ISA/210), dated Jan. 3, 2013, issued by the International Searching Authority in counterpart International Patent Application No. PCT/KR2012/006455.
(Continued)

*Primary Examiner* — Shan Elahi
(74) *Attorney, Agent, or Firm* — Sughrue Mion, PLLC

(57) ABSTRACT

Method and apparatus for processing multimedia data received via different networks by synchronizing time stamps of video frames of multimedia data received via the different networks using time codes in the multimedia data.

16 Claims, 9 Drawing Sheets

(51) Int. Cl.
  H04N 21/43  (2011.01)
  H04N 21/462  (2011.01)
  H04N 21/242  (2011.01)
  H04N 21/61  (2011.01)
  H04N 21/63  (2011.01)
(52) U.S. Cl.
  CPC ..... *H04N 21/4307* (2013.01); *H04N 21/4622* (2013.01); *H04N 21/6125* (2013.01); *H04N 21/631* (2013.01)
(58) Field of Classification Search
  USPC .................................................. 375/240.16
  See application file for complete search history.

(56) References Cited

U.S. PATENT DOCUMENTS

| | | | | | |
|---|---|---|---|---|---|
| 2002/0040478 | A1* | 4/2002 | Ando | ............... | H04N 21/4307 725/90 |
| 2002/0118676 | A1* | 8/2002 | Tonnby | ............... | H04L 12/2856 370/352 |
| 2003/0072290 | A1* | 4/2003 | Hwang | ............... | H03M 13/45 370/342 |
| 2003/0112743 | A1* | 6/2003 | You | ............... | H04L 27/2663 370/203 |
| 2003/0145334 | A1* | 7/2003 | Motoe | ............... | H04N 7/163 725/123 |
| 2004/0042387 | A1* | 3/2004 | Geile | ............... | G06F 17/14 370/206 |
| 2004/0125762 | A1* | 7/2004 | Haller | ............... | H04L 29/12311 370/313 |
| 2004/0257931 | A1* | 12/2004 | Kudou | ............... | G11B 20/10 369/47.1 |
| 2007/0058725 | A1* | 3/2007 | Iguchi | ............... | G11B 20/10527 375/240.23 |
| 2007/0129140 | A1* | 6/2007 | Walker | ............... | A63F 3/081 463/25 |
| 2007/0142022 | A1* | 6/2007 | Madonna | ............... | H04N 7/163 455/352 |
| 2007/0286279 | A1* | 12/2007 | Hamanaka | ............... | H04L 29/06027 375/240.12 |
| 2008/0037954 | A1 | 2/2008 | Lee et al. | | |
| 2008/0088737 | A1* | 4/2008 | Sullivan | ............... | H04B 1/66 348/500 |
| 2008/0172708 | A1* | 7/2008 | Perry | ............... | H04W 72/005 725/110 |
| 2009/0013363 | A1* | 1/2009 | Lee | ............... | H04H 20/24 725/110 |
| 2009/0013369 | A1 | 1/2009 | Seo et al. | | |
| 2009/0225818 | A1* | 9/2009 | Dapper | ............... | G06F 17/14 375/222 |
| 2010/0075611 | A1* | 3/2010 | Budampati | ............... | H04B 7/0885 455/67.11 |
| 2010/0142624 | A1 | 6/2010 | Fujita | | |
| 2010/0218227 | A1* | 8/2010 | Frink | ............... | H04N 7/17327 725/93 |
| 2010/0238264 | A1 | 9/2010 | Liu et al. | | |
| 2010/0278179 | A1* | 11/2010 | Zhao | ............... | H04L 1/188 370/390 |
| 2011/0052136 | A1 | 3/2011 | Homan et al. | | |
| 2011/0221960 | A1* | 9/2011 | Glaznev | ............... | H04N 21/2368 348/515 |
| 2011/0304618 | A1* | 12/2011 | Chen | ............... | G06T 7/0022 345/420 |
| 2012/0042333 | A1* | 2/2012 | Lee | ............... | H04H 20/33 725/31 |
| 2012/0218288 | A1* | 8/2012 | Cheng | ............... | G09G 3/003 345/619 |

FOREIGN PATENT DOCUMENTS

| | | |
|---|---|---|
| CN | 101557474 A | 10/2009 |
| EP | 2 141 689 A1 | 1/2010 |
| JP | 2002125203 A | 4/2002 |
| JP | 2004040455 A | 2/2004 |
| JP | 2004-254149 A | 9/2004 |
| JP | 2009-253538 A | 10/2009 |
| JP | 2009252538 A | 10/2009 |
| KR | 10-0738930 B1 | 7/2007 |
| KR | 10-2009-0003809 A | 1/2009 |
| KR | 10-2010-0104077 A | 9/2010 |
| WO | 02/51155 A1 | 6/2002 |
| WO | 2007/011889 A2 | 1/2007 |
| WO | 2009/020302 A2 | 2/2009 |
| WO | 2010053246 A2 | 5/2010 |

OTHER PUBLICATIONS

Communication from the European Patent Office issued Nov. 27, 2014, in a counterpart European Application No. 12823547.0.
Communication dated Aug. 22, 2016, issued by the European Patent Office in counterpart European Application No. 12823547.0.
Communication dated Sep. 2, 2016, issued by the State Intellectual Property Office of P.R. China in counterpart Chinese Application No. 201280039426.7.
Communication dated Sep. 6, 2016, issued by the Japanese Patent Office in counterpart Japanese Application No. 2014-524950.
Aoki et al: "A Transport Scheme for Media Components on Hybrid Broadcast Systems" IPSJ SIG Technical Report, vol. 2011-AVM-72, No. 1, Mar. 3, 2011, pp. 1-6, (6 pages total).
Communication dated Apr. 17, 2017, issued by the State Intellectual Property Office of P.R. China in counterpart Chinese application No. 201280039426.7.
Communication dated Jan. 17, 2017, issued by the Japanese Patent Office in counterpart Japanese application No. 2014-524950.

* cited by examiner

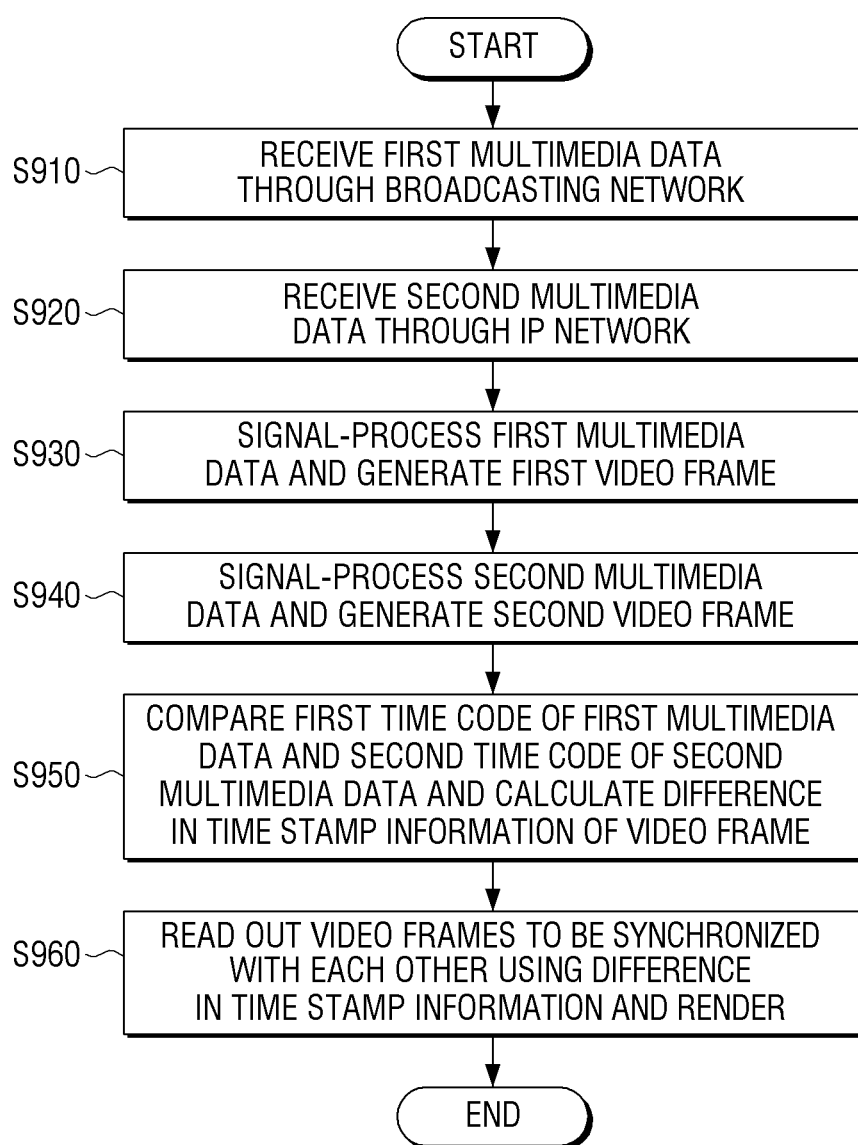

RECEIVING APPARATUS AND RECEIVING METHOD THEREOF

CROSS-REFERENCE TO RELATED APPLICATION

This application is a National Stage of International Application No. PCT/KR2012/006455, filed on Aug. 13, 2012, and claims priority from U.S. Provisional Application No. 61/522,906 filed on Aug. 12, 2011 and Korean Patent Application No 10-2012-0088488 filed on Aug. 13, 2012, the disclosure of which is incorporated herein in its entirety by reference.

FIELD OF THE INVENTION

Methods and apparatuses consistent with exemplary embodiments relate to a receiving apparatus and a receiving method thereof, and more particularly, to a receiving apparatus which receives and processes a plurality of streams, and a receiving method thereof.

BACKGROUND OF THE INVENTION

With the development of electronic technologies, various kinds of electronic apparatuses have been developed and distributed. In particular, televisions (TVs) are able to provide 3D contents or contents of higher resolution, and accordingly, development of technologies for providing a content including a plurality of images like a 3D content, a multi-angle content, and a content having depth images or a content of ultra high definition (UHD) level image quality is ongoing.

A channel bandwidth used in an existing broadcasting network is limited, whereas a multi-angle content, a 3D content, or a content of UHD level image quality has a data size greater than that of the existing content. Therefore, the existing broadcasting network has difficulty in transmitting the content of the great data size as it is.

Investing in new equipments to provide new contents may incur much cost. Existing broadcasting equipments and receiving apparatuses should be used to provide new contents. Accordingly, a method of transmitting reference multimedia data from among a plurality of multimedia data included in a multimedia content through an existing broadcasting network and transmitting additional multimedia data through a transmission path which his different from the existing broadcasting network may be considered.

However, when data is transmitted through different transmission networks, respective multimedia data use independent encoders. System clocks of the respective encoders do not match each other and thus it is difficult to add the same synchronization information.

SUMMARY

One or more exemplary embodiments provide a receiving apparatus which receives a plurality of streams through different paths and processes the streams, and a receiving method thereof. One or more exemplary embodiments also provide a method for synchronizing a plurality of streams provided through different paths and reproducing the plurality of streams.

According to an aspect of an exemplary embodiment, there is provided a receiving apparatus including: a first receiver configured to receive first multimedia data to which a first time code is added in every frame through a broadcasting network; a second receiver configured to receive second multimedia data to which a second time code is added in every frame through an IP network; a first signal processor configured to signal process the first multimedia data and generate a first video frame; a second signal processor configured to signal process the second multimedia data and generate a second video frame; a controller configured to compare the first time code of the first multimedia data and the second time code of the second multimedia data and calculate a difference in time stamp information of video frames having matching time codes; and a renderer configured to read out video frames to be synchronized with each other from among the first video frame and the second video frame using the difference in the time stamp information, and render the video frames.

The first signal processor may include: a first demultiplexer configured to demultiplex the received first multimedia data; a first buffer configured to store first video data which is demultiplexed from the first multimedia data; a first decoder configured to decode the first video data stored in the first buffer and generate the first video frame; and a second buffer configured to store the generated first video frame, and the second signal processor may include: a second demultiplexer configured to demultiplex the received second multimedia data; a third buffer configured to store second video data which is demultiplexed from the second multimedia data; a second decoder configured to decode the second video data stored in the third buffer and generate the second video frame; and a fourth buffer configured to store the generated second video frame.

The controller may correct time stamp information of one of the first video data and the second video data stored in the first buffer and the third buffer using the difference in the time stamp information.

The receiving apparatus may further include a storage configured to store the first multimedia data received through the first receiver, and, when the second multimedia data to be synchronized with the stored first multimedia data is received, the controller may control the first signal processor to process the stored first multimedia data.

The controller may compare the first time code added to the first multimedia data stored in the storage and the second time code added to the second multimedia data received through the second receiver, and may determine whether the second multimedia data to be synchronized with the stored first multimedia data is received or not.

When a user command to synchronize and reproduce the first multimedia data and the second multimedia data is input, the controller may control the storage to store the first multimedia data.

According to an aspect of another exemplary embodiment, there is provided a method for receiving of a receiving apparatus, the method including: receiving first multimedia data to which a first time code is added in every frame through a broadcasting network; receiving second multimedia data to which a second time code is added in every frame through an IP network; signal processing the first multimedia data and generating a first video frame; signal processing the second multimedia data and generating a second video frame; comparing the first time code of the first multimedia data and the second time code of the second multimedia data and calculating a difference in time stamp information of video frames having matching time codes; and reading out video frames to be synchronized with each other from among the first video frame and the second video frame using the difference in the time stamp information, and rendering the video frames.

The generating the first video frame may include: demultiplexing the received first multimedia data; storing first video data which is demultiplexed from the first multimedia data in a first buffer; decoding the first video data stored in the first buffer and generating the first video frame; and storing the generated first video frame in a second buffer, and the generating the second video frame may include: demultiplexing the received second multimedia data; storing second video data which is demultiplexed from the second multimedia data in a third buffer; decoding the second video data stored in the third buffer and generating the second video frame; and storing the generated second video frame in a fourth buffer.

The method may further include correcting time stamp information of one of the first video data and the second video data stored in the first buffer and the third buffer using the difference in the time stamp information.

The method may further include storing the first multimedia data received through a first receiver, and the generating the first video frame may include, when the second multimedia data to be synchronized with the stored first multimedia data is received, signal processing the stored first multimedia data.

The generating the first video frame may include comparing the first time code added to the stored first multimedia data and the second time code added to the received second multimedia data, and determining whether the second multimedia data to be synchronized with the stored first multimedia data is received or not.

The storing may include, when a user command to synchronize and reproduce the first multimedia data and the second multimedia data is input, storing the first multimedia data.

According to the above-described various exemplary embodiments, different data are received and transmitted through different paths using existing broadcasting equipments and the limitation of the transmission bandwidth is overcome, so that new contents can be provided to the user.

Also, even when a plurality of streams are provided through different paths, multimedia data can be effectively synchronized and reproduced.

BRIEF DESCRIPTION OF THE DRAWINGS

The above and/or other aspects of the invention will become and more readily appreciated from the following description of the exemplary embodiments, taken in conjunction with the accompanying drawings of which:

FIG. 9 is a flowchart to illustrate a receiving method of a receiving apparatus according to an exemplary embodiment.

DETAILED DESCRIPTION OF EXEMPLARY EMBODIMENTS

Figure 1:
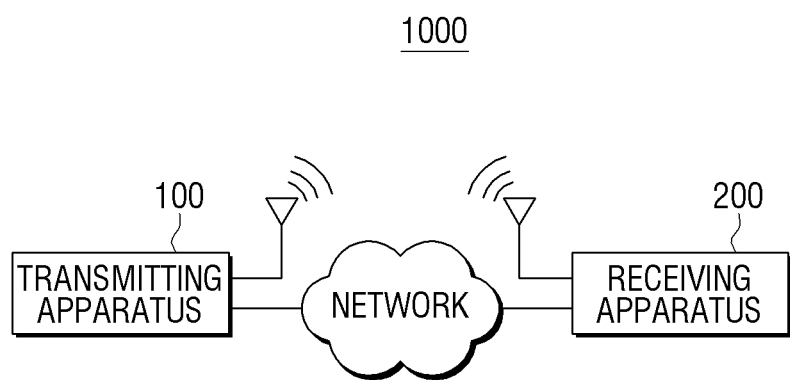
FIG. 1 is a view illustrating a multimedia data exchanging system according to an exemplary embodiment.

Reference will now be made in detail to the present exemplary embodiments of the present invention, examples of which are illustrated in the accompanying drawings, wherein like reference numerals refer to the like elements throughout. The exemplary embodiments are described below in order to explain the present invention by referring to the figures.

FIG. 1 is a view illustrating a multimedia data exchanging system according to an exemplary embodiment. Referring to FIG. 1, a multimedia data exchanging system 1000 includes a transmitting apparatus 100 and a receiving apparatus 200.

The transmitting apparatus 100 processes multimedia data and transmits different signals through different transmission networks. For example, the transmitting apparatus 100 may transmit a first signal through a first transmission network and may transmit a second signal through a second transmission network.

The first signal and the second signal may be different multimedia data constituting a single content, or may be multimedia data of relatively low image quality and multimedia data of relatively high image quality. For example, when the multimedia data is a 3D content, one of a left-eye image and a right-eye image may be transmitted through the first transmission network and the other one may be transmitted through the second transmission network. For another example, a first signal of full high definition (FHD) image quality may be transmitted through the first transmission network, and a second signal of ultra high definition (UHD) image quality may be transmitted through the second transmission network. In addition, the first signal and the second signal may be multimedia data constituting a multi-angle content, a 2D image or, a depth image.

Herein, the first transmission network may be a radio frequency (RF) network (or a broadcasting network) and the second transmission network may be an internet protocol (IP) network (or Internet). However, this is merely an example. The first transmission network may be the IP network and the second transmission network may be the RF network or the first transmission network and the second transmission network may be the same type of network.

The receiving apparatus 200 may receive the first signal and the second signal from the transmitting apparatus 100, perform signal processing with respect to the multimedia data, synchronize the multimedia data, and reproduce the content.

The receiving apparatus 200 may receive the second signal from a server. That is, the receiving apparatus 200 may receive the second signal directly from the transmitting apparatus 100 or may receive the second signal generated in the transmitting apparatus 100 through a separate server.

The signal transmitted through the first transmission network and the second transmission network may include a Program Clock Reference (PCR), a Decoding Time Stamp (DTS), and a Presentation Time Stamp (PTS) for synchronizing.

The PCR refers to reference time information based on which the receiving apparatus (set-top box or TV) sets a time reference according to that of the transmitting apparatus. The receiving apparatus sets a System Time Clock (STC) value according to the PCR. The DTS is a time stamp for informing a decoding time of data, and the PTS refers to a time stamp for informing a reproducing time for synchronizing a video and a voice. The DTS and the PTS are referred to as a time stamp in the present specification.

When different signals are transmitted from different transmitting apparatuses 100-1 and 100-2, the PCR may be different according to characteristics of the transmitting apparatuses 100-1 and 100-2. Specifically, this is because that different signals use different encoders, and the respective encoders may not have consistent system operation clock information and may have different operation way and delay. Therefore, although the receiving apparatus reproduces the content according to the time stamp matching the PCR, synchronization may not be performed.

The receiving apparatus 200 of the system according to the exemplary embodiment may correct the time stamp using a time code and may perform synchronization.

Figure 2:
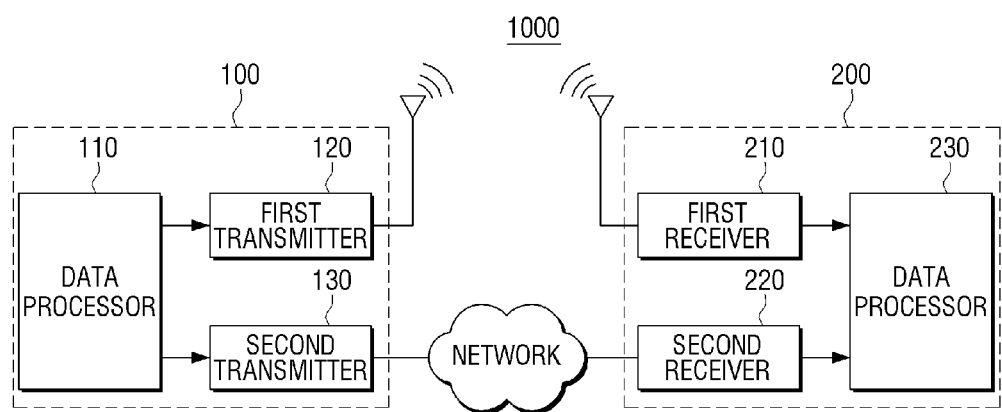
FIG. 2 is a block diagram illustrating a configuration of a multimedia data exchanging system according to an exemplary embodiment.

FIG. 2 is a block diagram illustrating a configuration of a multimedia data exchanging system according to an exemplary embodiment. Referring to FIG. 2, a transmitting apparatus 100 of a multimedia data exchanging system 1000 includes a data generator 110, a first transmitter 120, and a second transmitter 130.

The data processor 110 processes multimedia data and transmits the multimedia data to the first transmitter 120 and the second transmitter 130. Specifically, the data processor 110 processes first multimedia data and second multimedia data constituting a multimedia content and transmits the first multimedia data and the second multimedia data to the first transmitter 120 and the second transmitter 130, respectively. The first multimedia data and the second multimedia data may include synchronization information for synchronizing.

The first transmitter 120 transmits the first multimedia data to a receiving apparatus 200 through a first transmission network. To achieve this, the first transmitter 120 may convert the first multimedia data into a form suitable for a transmission standard of the first transmission network and may transmit the first multimedia data to the receiving apparatus 200.

The second transmitter 130 transmits the second multimedia data to the receiving apparatus 200 through a second transmission network. To achieve this, the second transmitter 130 may convert the second multimedia data to a form suitable for a transmission standard of the second transmission network.

The receiving apparatus 200 of the multimedia data exchanging system includes a first receiver 210, a second receiver 220, and a data processor 230.

The first receiver 210 receives the first multimedia data from the transmitting apparatus 100 through the first transmission network. The second receiver 220 receives the second multimedia data from the transmitting apparatus 100 through the second transmission network. For example, the first receiver 210 may receive the first multimedia data through a broadcasting network and the second receiver 220 may receive the second multimedia data through an IP network.

The data processor 230 processes the first transmission data and the second transmission data and forms a multimedia content. Specifically, the data processor 230 signal processes the first multimedia data and the second multimedia data and generates video frames, and synchronizes the video frame of the first multimedia data and the video frame of the second multimedia data using synchronization information included in the first multimedia data and the second multimedia data, and renders the video frames.

Figure 3:
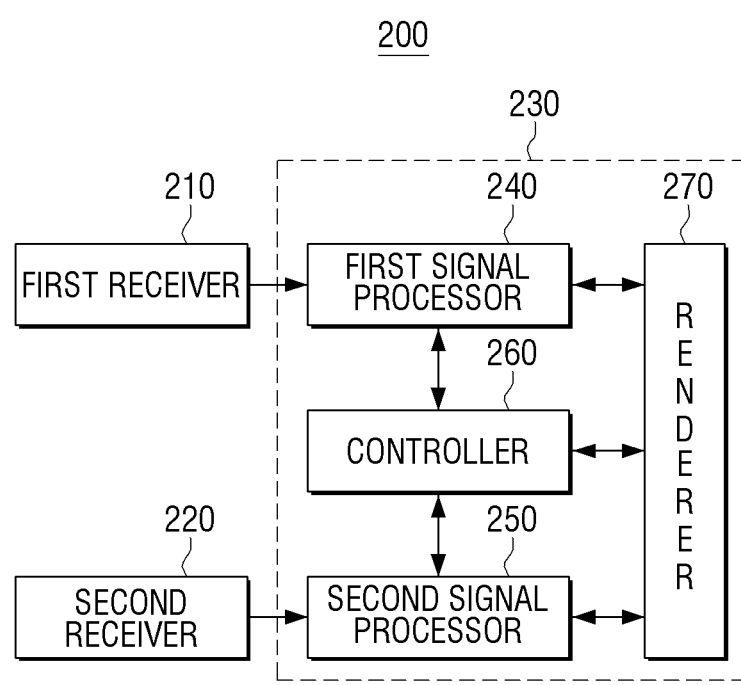
FIG. 3 is a block diagram illustrating a detailed configuration of a receiving apparatus according to an exemplary embodiment.

FIG. 3 is a block diagram illustrating a detailed configuration of a receiving apparatus according to an exemplary embodiment. Referring to FIG. 3, a receiving apparatus 200 includes a first receiver 210, a second receiver 220, a first signal processor 240, a second signal processor 250, a controller 260, and a renderer 270.

The first receiver 210 receives first multimedia data. Specifically, the first receiver 210 may receive first multimedia data to which a first time code is added in every frame through a broadcasting network.

The second receiver 220 receives second multimedia data. Specifically, the second receiver 220 may receive second multimedia data to which a second time code is added in every frame through the broadcasting network.

The configurations of the first receiver 210 and the second receiver 220 may be implemented variously according to their communication paths. For example, when the first receiver 210 and the second receiver 220 are modules to receive signals transmitted through a broadcasting network, the first receiver 210 and the second receiver 220 may include elements likes an antenna, a tuner, a demodulator, an equalizer, etc. When the first receiver 210 and the second receivers 220 are modules to receive signals through a network, the first receiver 210 and the second receiver 220 may include a network communication module.

The time code added to the respective multimedia data may be a Society of Motion Picture and Television Engineers (SMPTE) time code. SMPTE 12M represents a time code in the form of "clock:minute:second:frame". The SMPTE 12M time code may be inserted when raw data such as a movie, a video, a sound, etc. is obtained and edited, and may serve as a reference to correct and edit on a time axis. The raw data obtained on the same time axis may have the same time code value.

The SMPTE time code may be divided into a Longitude Time Code (LTC) and a Vertical Interval Time Code (VITC) according to a recording method. The LTC is recorded according to an advancing direction of a tape. The LTC may consist of data of 80 bits in total, including visual information (25 bits), user information (32 bits), synchronization information (16 bits), reserved area (4 bits), and frame mode display (2 bits). The VITC is recorded on two horizontal lines within a vertical blanking interval of a video signal.

SMPTE RP-188 defines an interface standard for transmitting a time code of an LTC or VITC type as ancillary data, and the time code may be transmitted according to such an interface standard.

The first and second multimedia data may include a time stamp for synchronizing in addition to the time code. Specifically, the first and second multimedia data each includes a DTS and a PTS. It is common that the time stamp is used as synchronization information for synchronizing. However, in heterogenous network-based multimedia data exchanging system, the first multimedia data and the second multimedia data are encoded by different encoders and thus there is a problem that system clocks may not be consistent with each other. Accordingly, the above-described time code may be used for synchronizing. A detailed description thereof will be provided below.

Figure 4:
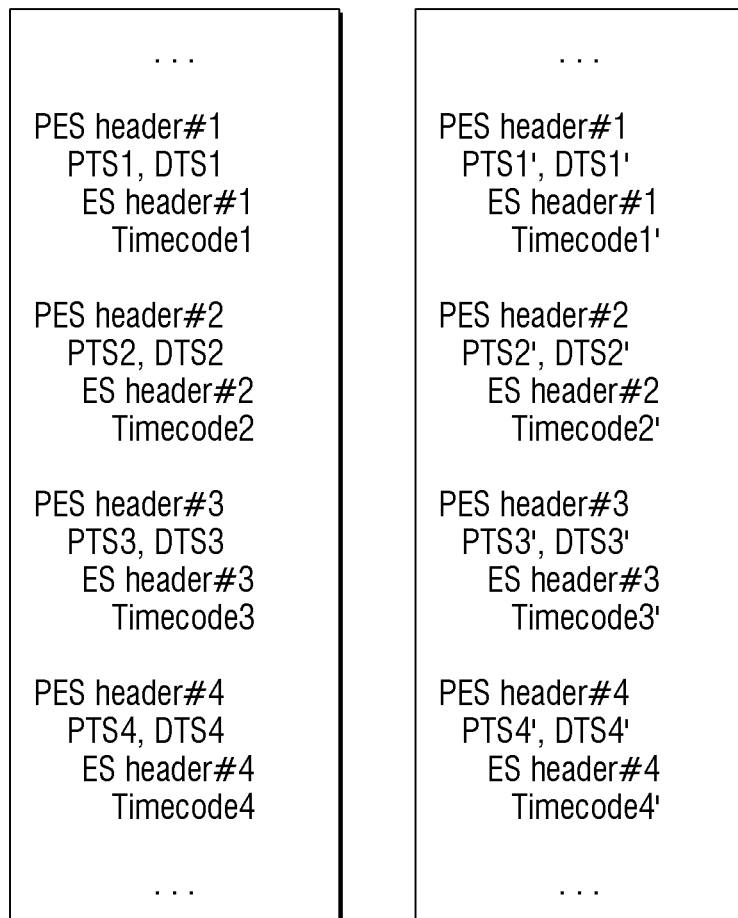
FIG. 4 is a view illustrating an example of a stream to which a time code and a time stamp are added according to an exemplary embodiment.

FIG. 4 is a view illustrating an example of a stream to which a time code and a time stamp are added according to an exemplary embodiment. The transmitting apparatus 100 may transmit the first multimedia data and the second multimedia data in the form of a transport stream.

Specifically, the transmitting apparatus 100 may generate a transport stream by packetizing a video Elementary Stream (ES), an audio ES, and an additional data ES constituting multimedia data using a Packetized Elementary Stream (PES) packetizer, and then multiplexing the video ES, the audio ES, and the additional data ES. As shown in FIG. 4, respective PES headers include PTS and DTS information, and ES headers include time code information. In particular, the time code information may be included in one of the video ES header, the audio ES header, and the additional data ES header.

The first signal processor 240 signal processes the first multimedia data received through the first receiver 210 and generates a video frame. The second signal processor 250 signal processes the second multimedia data received through the second receiver 220 and generates a video frame. The first signal processor 240 and the second signal processor 250 will be explained in detail with reference to FIG. 5.

Figure 5:
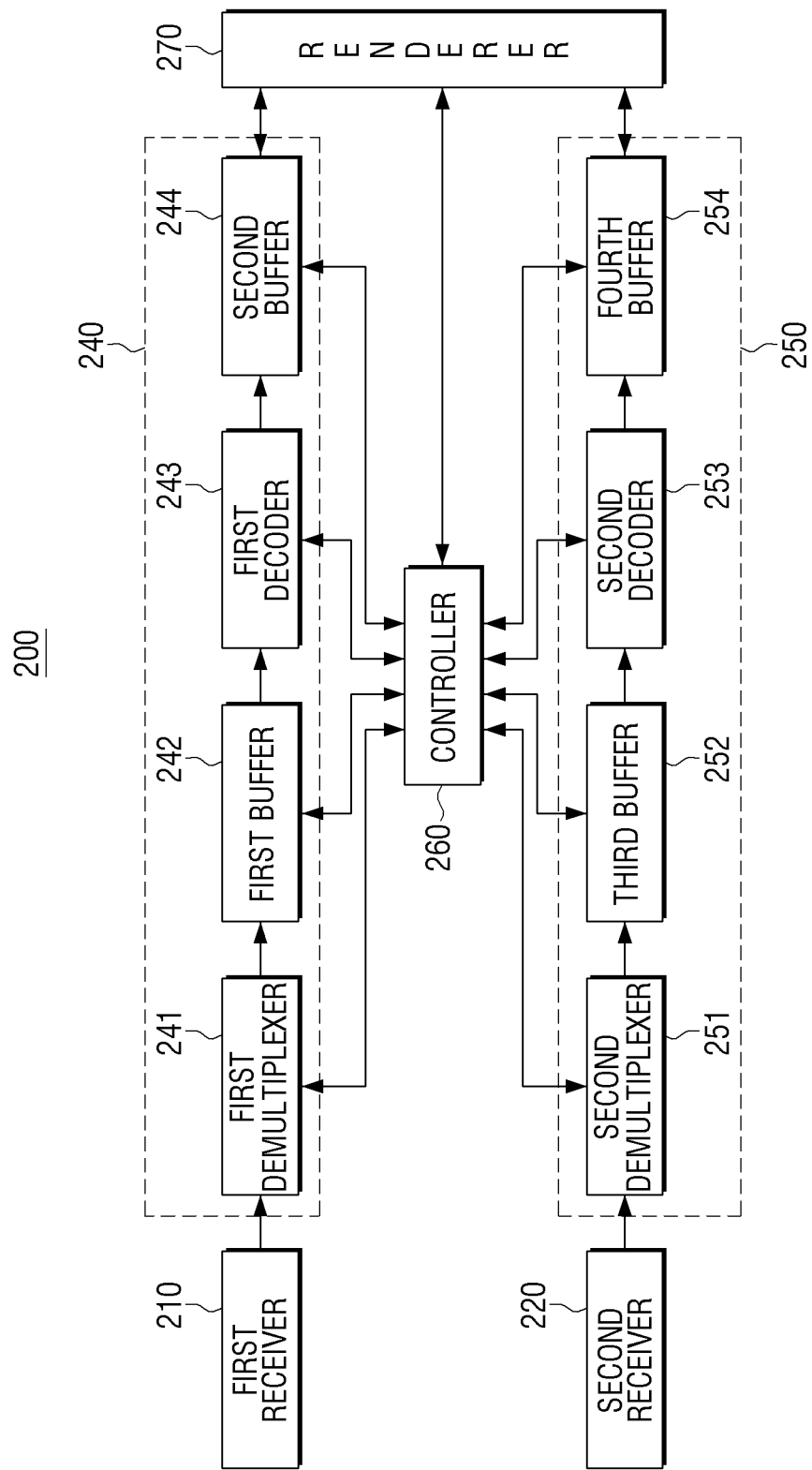
FIG. 5 is a block diagram to illustrate detailed configurations of first and second signal processors according to an exemplary embodiment.

FIG. 5 is a block diagram to illustrate detailed configurations of the first and second signal processors according to an exemplary embodiment. Referring to FIG. 5, the first signal processor 240 includes a first demultiplexer 241, a first buffer 242, a first decoder 243, and a second buffer 244.

The first demultiplexer 241 receives the first multimedia data from the first receiver 210 and demultiplexes the first multimedia data. Specifically, the first demultiplexer 241 receives and demultiplexes the first multimedia data, thereby dividing the first multimedia data into first video data, first audio data, and first additional data.

The first buffer 242 stores the first video data which is demultiplexed from the first multimedia data. Specifically, the first buffer 242 may store the first video data which is demultiplexed from the first multimedia data in sequence.

The first decoder 243 decodes the first video data which is stored in the first buffer 242, and generates a first video frame. Specifically, the first decoder 242 performs a reverse process of the encoder (not shown) which encodes the first video data in the transmitting apparatus 100, and decodes the first video data when the DTS of the first video data is consistent with the system clock. In particular, the encoder (not shown) of the transmitting apparatus 100 which encodes the first video data may perform MPEG-2 encoding with respect to the first video data for the sake of compatibility with an existing receiving apparatus which does not support data reception through a heterogenous network, and accordingly, the first decoder 242 of the receiving apparatus 200 may perform MPEG-2 decoding with respect to the first video data. However, the first video data is not limited to such a video format and may be encoded and decoded according to various video formats which are currently available such as H.264, HEVC, etc., and video formats which will be developed in the future and applicable to the present disclosure.

The second buffer 244 stores the first video frame which is generated by the first decoder 243. Specifically, the second buffer 244 may store the video frames which are generated in order of decoding the first video data by the first decoder 243 in sequence.

Referring to FIG. 5, the second signal processor 250 includes a second demultiplexer 251, a third buffer 252, a second decoder 253, and a fourth buffer 254.

The second demultiplexer 251 receives the second multimedia data from the second receiver 220 and demultiplexes the second multimedia data. Specifically, the second demultiplexer 251 receives and demultiplexes the second multimedia data, thereby dividing the second multimedia data into second video data, second audio data, and second additional data.

The third buffer 252 stores the second video data which is demultiplexed from the second multimedia data. Specifically, the third buffer 252 may store the second video data which is demultiplexed from the second multimedia data in sequence.

The second decoder 253 decodes the second video data which is stored in the third buffer 252, and generates a second video frame. Specifically, the second decoder 252 performs a reverse process of the encoder (not shown) which encodes the second video data in the transmitting apparatus 100, and decodes the second video data when the DTS of the second video data is consistent with the system clock. In particular, the encoder (not shown) of the transmitting apparatus 100 which encodes the second video data may perform H.264 encoding with respect to the second video data, and accordingly, the second decoder 252 of the receiving apparatus 200 may perform H.264 decoding with respect to the second video data. However, the second video data is not limited to such a video format and may be encoded and decoded according to various video formats which are currently available such as HEVC, etc., and video formats which will be developed in the future and applicable to the present disclosure.

The fourth buffer 254 stores the second video frame which is generated by the second decoder 253. Specifically, the fourth buffer 254 may store the video frames which are generated in order of decoding the second video data by the second decoder 253 in sequence.

The first and second signal processors 240 and 250 may further include a depacketizer to depacketize the demultiplexed video data, audio data, and additional data, and a buffer (not shown) and a decoder (not shown) to process the depacketized audio data and additional data. The decoded audio data and additional data may be synchronized with the first video frame and the second video frame or rendered and may be output. However, this feature has no direct relationship with the present disclosure and thus a detailed description thereof is omitted.

The controller 260 may control an overall operation of the receiving apparatus 260. Specifically, the controller 260 controls the first receiver 210, the second receiver 220, the first signal processor 240, the second signal processor 250, and the renderer 270 to receive and process the first multimedia data and the second multimedia data.

The controller 260 may detect information on the time code and the time stamp from the demultiplexed first multimedia data and second multimedia data. As described above with reference to FIG. 3, the time code may be inserted into the ES header and the time stamp may be inserted into the PES header. Accordingly, the controller 260 may detect the time code and the time stamp after the first multimedia data and the second multimedia data have been demultiplexed. More specifically, the controller 260 may detect the time stamp from the PES header which is generated by demultiplexing the multimedia data, and may detect the time code from the ES header which is generated by depacketizing the PES using the depacketizer (not shown).

Also, the controller 260 may detect the time code at any time after the multimedia data has been demultiplexed and depacketerized. That is, the controller 260 may detect the time code from the video data which has been demultiplexed and stored in the buffer 242 or 252, or may detect the time code during the decoding process of the decoder 243 or 253.

Also, the controller 260 may detect the time code from the data which has been decoded and stored in the buffer 244 or 254.

The controller 260 may compare a first time code of the first multimedia data and a second time code of the second multimedia data, and may calculate a difference in time stamp information of video frames that have matching time codes.

For example, when the first video frame and the second video frame have the same time code, and a PTS of the first video frame (PTS_1) is 115 and a PTS of the second video frame (PTS_2) is 100, a difference in the PTS of the two frames may be 15. The same rule is applied to the DTS.

The controller 260 calculates the difference in the time stamp information and corrects the time stamp, so that the first video data (or the first video frame) and the second video data (or the second video frame) can be synchronized with each other. For example, when PTS_1-PTS_2=15, the PTS may be corrected so that the first video frame is output 15 frames later than the second video frame which has the same time code as that of the first video frame.

The controller 260 may correct the DTS of one of the first and second video data stored in the first buffer 242 and the third buffer 252 using the difference in the time stamp information, so that the video data can be synchronized before being decoded by the decoders 243 and 253.

In addition, the controller 260 may correct the DTS (or the PTS) of the first video data and the second video data (or the first and second video frames) using the difference in the time stamp information during the decoding process of the first decoder 243 and the second decoder 253, so that the video data can be synchronized.

In addition, the controller 260 may correct the PTS of one of the first and second video frames stored in the second buffer 244 and the fourth buffer 254 using the difference in the time stamp information, so that the video frames can be synchronized before being input to the renderer 270.

The renderer 270 may perform rendering using the first video frame and the second video frame. Specifically, the renderer 270 renders the first video frame and the second video frame when the PTS of the first video frame and the second video frame is consistent with the system clock, and displays the first video frame and the second video frame on a display screen.

The renderer 270 may read out the video frame that is to be synchronized from among the first video frame stored in the second buffer 244 and the second video frame stored in the fourth buffer 254 using the difference in the time stamp information calculated by the controller 260, and may render the video frame.

In the above-described exemplary embodiment, the time code is inserted into the ES header of the transport stream and is transmitted to the receiving apparatus 200. However, the receiving apparatus 200 may receive information on the time code through a separate stream and may synchronize the first video data and the second video data. Specifically, the receiving apparatus 200 may receive a map table including a packet order of the first multimedia data and the second multimedia data and the time code and the PTS information of the video frame included in each packet from an external apparatus such as a server through the first receiver 210 or the second receiver 220. The controller 260 may compare the time code information of the first multimedia data and the second multimedia data, which is included in the received map table, and may compare the PTS of the first multimedia data and the second multimedia data having the matching time codes and calculate a difference in the PTS.

Figure 6:
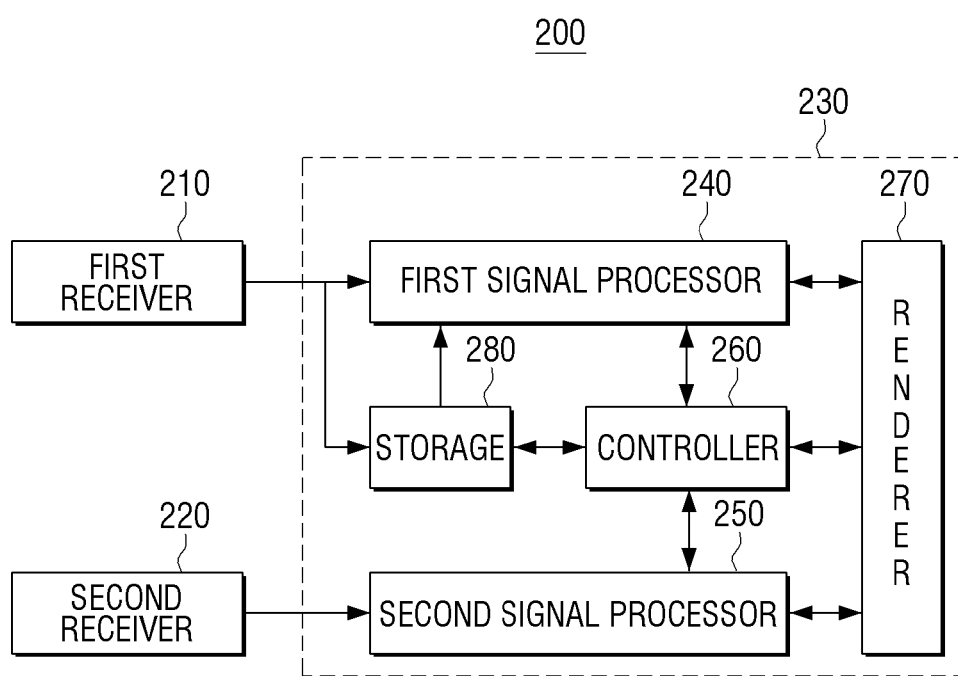
FIG. 6 is a block diagram illustrating a configuration of a receiving apparatus according to another exemplary embodiment.

FIG. 6 is a block diagram illustrating a configuration of a receiving apparatus according to another exemplary embodiment. Referring to FIG. 6, a receiving apparatus 200 may further include a storage 280 in addition to a first receiver 210, a second receiver 220, a first signal processor 240, a second signal processor 250, a controller 260, and a renderer 270.

When the receiving apparatus 200 receives first multimedia data and second multimedia data through different networks, there may be a difference in receiving time according to characteristics of the networks. In particular, when the first multimedia data is transmitted through a broadcasting network and the second multimedia data is transmitted through an IP network, the second multimedia data may be late transmitted to the receiving apparatus due to the characteristics of the IP network. When the first multimedia data and the second multimedia data are received at similar time, the first multimedia data and the second multimedia data may be in condition in which they can be synchronized with each other by correcting the time stamp as described above. However, when a difference in the receiving time between the first multimedia data and the second multimedia data is great, it may be impossible to synchronize simply by correcting the PTS. That is, when one of the first multimedia data and the second multimedia data is late received, video frames having the same time code cannot be found and thus it may be impossible to synchronize the respective video frames.

Accordingly, the receiving apparatus 200 may include the storage 280 to store the first multimedia data or the second multimedia data to delay the multimedia data that is received first from among the first multimedia data and the second multimedia data. The storage 280 may be implemented by using a Personal Video Recorder (PVR). Hereinafter, a case in which the first multimedia data is received through a broadcasting network and the second multimedia data is received through an IP network will be explained by way of an example.

When the first multimedia data is received through the broadcasting network and the second multimedia data is received through the IP network, the storage 280 may store the first multimedia data received through the first receiver 210.

When the second multimedia data to be synchronized with the multimedia data stored in the storage 280 is received, the controller 260 may control the first signal processor 240 to process the first multimedia data. The controller 260 may compare a first time code added to the first multimedia data stored in the storage 280 and a second time code added to the second multimedia data received through the second receiver 220, thereby determining whether the second multimedia data to be synchronized with the multimedia data stored in the storage 280 is received or not.

Specifically, the controller 260 detects a time code from the first multimedia data stored in the storage 280. As explained in FIG. 3, the time code may be inserted into the ES header, and the controller 260 should demultiplex the first multimedia data stored in the storage 280 to detect the time code from the first multimedia data (More specifically, the time code may be detected after the PES data which is generated by demultiplexing the first multimedia data is depacketized). To achieve this, the first signal processor may demultiplex the first multimedia data using the first demultiplexer 241. Also, the first signal processor 240 may include a separate demultiplexer to demultiplex the first multimedia data stored in the storage 280.

Also, when the second multimedia data is received through the second receiver 220, the controller 260 may detect a time code from the second multimedia data. The controller 260 may compare the time code detected from the second multimedia data and the time code detected from the first multimedia data stored in the storage 280, and, when there are matching time codes, may determine that the second multimedia data to be synchronized with the first multimedia data stored in the storage 280 is received.

When the controller 260 determines that the second multimedia data to be synchronized with the first multimedia data is received, the controller 260 may control the respective elements of the receiving apparatus 200 to synchronize and reproduce the first multimedia data and the second multimedia data. This has been described above with reference to FIG. 5 and a detailed description is omitted.

The receiving apparatus 200 may perform a different operation according to a condition in which the first multimedia data is stored in the storage 280. This will be explained in detail with reference to FIGS. 7 and 8.

Figure 7:
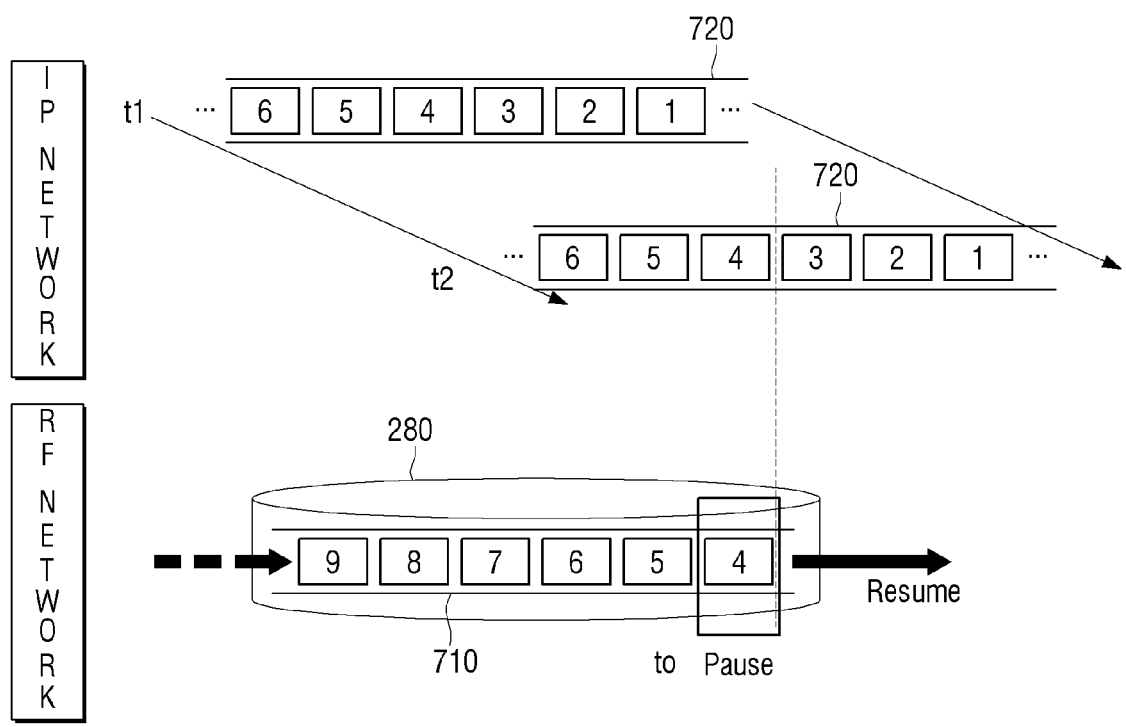
FIG. 7 is a view to illustrate a method for delaying and processing first multimedia data according to an exemplary embodiment.

FIG. 7 is a view to illustrate a method for delaying first multimedia data and processing the first multimedia data according to an exemplary embodiment. Specifically, FIG. 7 illustrates a method in which, when the receiving apparatus 200 receives a user command to synchronize and reproduce first multimedia data and second multimedia data while processing and reproducing only the first multimedia data, the receiving apparatus 200 stores the first multimedia data received from the time when the user command is input.

When a user command to synchronize and reproduce the first multimedia data and the second multimedia data is input while the first multimedia data 710 is received through the RF network and reproduced (for example, when a user command to reproduce a 3D content is input while a 2D content is reproduced, the first multimedia data received after the user command is input (after the fourth packet of the first multimedia data 710 of FIG. 7) is stored in the storage 280.

When the user command is input, the receiving apparatus 200 may request the second multimedia data from the transmitting apparatus 100 or a server which provides the second multimedia data, and may receive the second multimedia data 720 through the IP network. In this case, there is a delay between a time when the user command is input and a time when the first multimedia data and the second multimedia data are synchronized and reproduced. For example, a predetermined time is required until the receiving apparatus 200 requests the second multimedia data and receives a first packet, and additionally, a predetermined time may be required from a time (t1) when the first packet of the second multimedia data is received to a time (t2) when a fourth packet of the second multimedia data to be synchronized with the first multimedia data stored in the storage 280 and reproduced is received.

Accordingly, the receiving apparatus 200 may stop reproducing the first multimedia data from the time (t0) when the user command is input to the time (t2) when the fourth packet of the second multimedia data is received, and may synchronize and reproduce the second multimedia data and the first multimedia data when the fourth packet of the second multimedia data is received.

Also, even when the user command is input, the receiving apparatus 200 may reproduce only the first multimedia data, and, when the fourth packet of the second multimedia data is received (t2), the receiving apparatus 200 may synchronize the fourth packet of the second multimedia data and the first multimedia data again and reproduce the second multimedia data and the first multimedia data.

As a result, even when reception of the second multimedia data through the IP stream is delayed, the receiving apparatus 200 delays processing the first multimedia data stored in the storage 280 and synchronizes and reproduces the first multimedia data and the second multimedia data.

Figure 8:
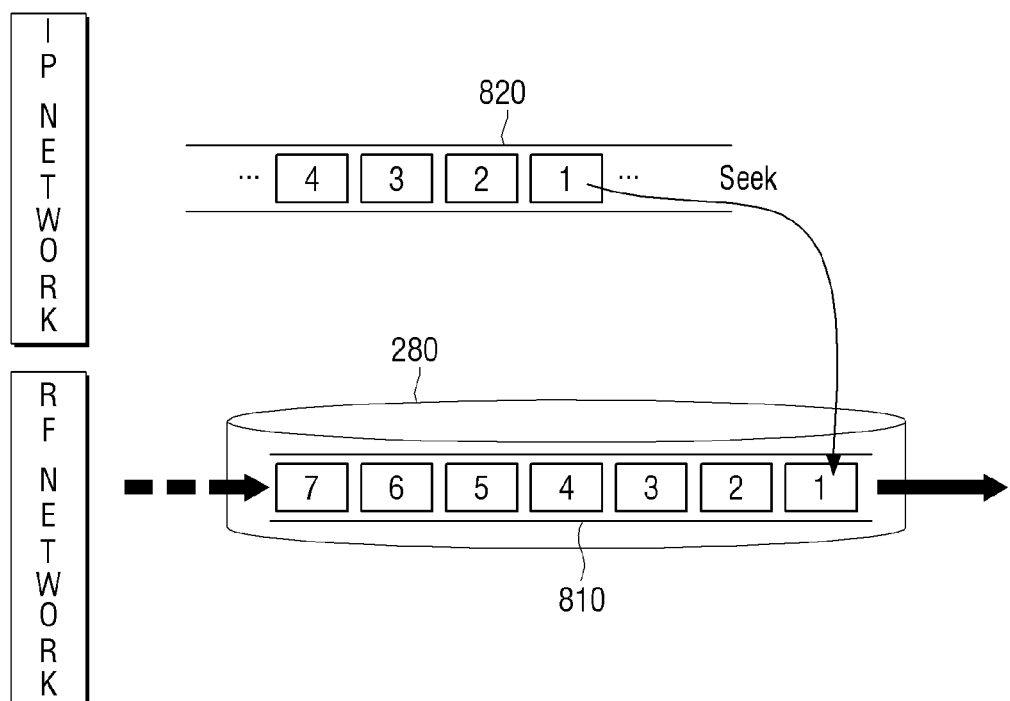
FIG. 8 is a view to illustrate a method for delaying and processing first multimedia data according to another exemplary embodiment.

FIG. 8 is a view to illustrate a method for delaying and processing first multimedia data according to another exemplary embodiment. Specifically, FIG. 8 is a view to illustrate a case in which the receiving apparatus 200 stores first multimedia data in the storage 280 from the time when the first multimedia data 810 is initially reproduced (that is, a case in which the first multimedia data is stored from its first packet).

The receiving apparatus 200 receives the first multimedia data 810 through the RF network and reproduces the first multimedia data 810, and stores the first multimedia data in the storage 280 from the first packet. After that, when a user command to synchronize and reproduce the first multimedia data and the second multimedia data is input, the receiving apparatus 200 requests the second multimedia data 820 from the transmitting apparatus 100 or the server and receives the second multimedia data 820 through the IP network. When the first packet of the second multimedia data is received, the receiving apparatus 200 finds a packet of the first multimedia data that is to be synchronized with the first packet of the second multimedia data and reproduced from among the packets of the first multimedia data stored in the storage 280 (that is, the first packet of the first multimedia data), synchronizes the packet of the first multimedia data and the first packet of the second multimedia data, and outputs the packets. That is, the receiving apparatus 200 may synchronize the first multimedia data and the second multimedia data and may reproduce the multimedia content from the beginning.

As a result, even when the reception of the second multimedia data through the IP stream is delayed, the receiving apparatus 200 delays processing the first multimedia data stored in the storage 280 and synchronizes and reproduces the first multimedia data and the second multimedia data.

FIG. 9 is a flowchart to illustrate a receiving method of a receiving apparatus according to an exemplary embodiment. Referring to FIG. 9, first multimedia data is received through a broadcasting network (S910) and second multimedia data is received through an IP network (S920). The first multimedia data is signal processed and a first video frame is generated (S930). The generating the first video frame may include demultiplexing the first multimedia data, storing first video data demultiplexed from the first multimedia data in a first buffer, decoding the first video data and generating a first video frame, and storing the first video frame in a second buffer.

The second multimedia data is signal processed and a second video frame is generated (S940). The generating the second video frame may include demultiplexing the second multimedia data, storing second video data demultiplexed from the second multimedia data in a third buffer, decoding the second video data and generating a second video frame, and storing the second video frame in a fourth buffer.

A first time code of the first multimedia data and a second time code of the second multimedia data are compared with each other and a difference in time stamp information of video frames having matching time codes is calculated (S950).

After that, video frames to be synchronized are read out from among the first video frame and the second video frame using the difference in the time stamp information and rendering is performed (S960).

The receiving method of the receiving apparatus according to an exemplary embodiment may further include correcting time stamp information of one of the first video data and the second video data stored in the first buffer and the third buffer using the difference in the time stamp information.

Also, the receiving method may further include storing the first multimedia data received through a first receiver. The generating the first video frame may include signal processing the first multimedia data when the second multimedia data to be synchronized with the first multimedia data is received.

Also, the generating the first video frame may include comparing a first time code added to the stored first multimedia data and a second time code added to the received second multimedia data, and determining whether the second multimedia data to be synchronized with the stored first multimedia data is received or not.

Also, the storing may include, when a user command to synchronize and reproduce the first multimedia data and the second multimedia data is input, storing the first multimedia data.

A program to perform the method according to the above-described various exemplary embodiments may be stored on various kinds of recording media and used.

Specifically, a code to perform the above-described methods may be stored in various kinds of non-volatile recording media such as a flash memory, a Read Only Memory (ROM), an Erasable Programmable ROM (EPROM), an Electronically Erasable and Programmable ROM (EE-PROM), a hard disk, a removable disk, a memory card, a USB memory, and a CD-ROM.

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A receiving apparatus comprising:
   a first receiver configured to receive, through a broadcasting network, first multimedia data comprising a first time stamp information, each frame of the first multimedia data comprising a first time code;
   a second receiver configured to receive, through an Internet Protocol (IP) network, second multimedia data comprising a second time stamp information, each frame of the second multimedia data comprising a second time code;
   a processor configured to compare the first time code and the second time code, identify a difference in time stamp information of video frames comprising matching time codes, and reproduce by synchronizing the video frames comprising the matching first and second time codes based on the difference,
   wherein the first time stamp information comprises at least one of a first Decoding Time Stamp, DTS, and a first Presentation Time Stamp, PTS, and
   wherein the second time stamp information comprises at least one of a second DTS and a second PTS.

2. The receiving apparatus of claim 1, wherein the processor comprises:
   a first and second demultiplexer configured to demultiplex the received first and second multimedia data, respectively;
   a first and second buffer configured to store first and second video data which is demultiplexed from the first and second multimedia data, respectively;
   a first and second decoder configured to decode the first and second video data stored in the first and second buffer when the first DTS and the second DTS are consistent with a system clock and obtain the first and second video frame, respectively;
   a third and fourth buffer configured to store the obtained first and second video frame, respectively.

3. The receiving apparatus of claim 2, wherein the processor is further configured to correct the time stamp information of one of the first video data and the second video data stored in the first buffer and the second buffer using the difference in the time stamp information.

4. The receiving apparatus of claim 1, further comprising a storage configured to store the first multimedia data received through the first receiver,
   wherein, in response to the second multimedia data to be synchronized with the stored first multimedia data being received, the processor processes the stored first multimedia data.

5. The receiving apparatus of claim 4, wherein the processor is further configured to compare the first time code added to the first multimedia data stored in the storage and the second time code added to the second multimedia data received through the second receiver, and determine whether the second multimedia data to be synchronized with the stored first multimedia data is received or not.

6. The receiving apparatus of claim 4, wherein, when a user command to reproduce by synchronizing the first multimedia data and the second multimedia data is input, the processor is further configured to control the storage to store the first multimedia data.

7. A method for receiving of a receiving apparatus, the method comprising:
   receiving, through a broadcasting network, first multimedia data comprising a first time stamp information, each frame of the first multimedia data comprising a first time code;
   receiving, through an Internet Protocol (IP) network, second multimedia data comprising a second time stamp information, each frame of the second multimedia data comprising a second time code;
   comparing the first time code of the first multimedia and the second time and identifying a difference in time stamp information of video frames comprising matching time codes; and
   reproduce by synchronizing the video frames comprising the matching first and second time codes based on the difference,
   wherein the first time stamp information comprises at least one of a first Decoding Time Stamp, DTS, and a first Presentation Time Stamp, PTS, and
   wherein the second time stamp information comprises at least one of a second DTS and a second PTS.

8. The method of claim 7, further comprises;
   demultiplexing the received first and second multimedia data, respectively;
   storing first and second video data which is demultiplexed from the first and second multimedia data in a first and second buffer, respectively;

decoding the first and second video data stored in the first and second buffer if the first DTS and the second DTS are consistent with a system clock and obtaining the first and second video frame; and storing the obtained first and second video frame in a third and fourth buffer.

9. The method of claim 8, further comprising correcting the time stamp information of one of the first video data and the second video data stored in the first buffer and the second buffer using the difference in the time stamp information.

10. The method of claim 7, further comprises; storing the first multimedia data received through a first receiver; and, in response to the second multimedia data to be synchronized with the stored first multimedia data being received, processing the stored first multimedia data.

11. The method of claim 10, wherein the generating the first video frame comprises:

comparing the first time code added to the stored first multimedia data and the second time code added to the received second multimedia data; and determining whether the second multimedia data to be synchronized with the stored first multimedia data is received or not.

12. The method of claim 10, wherein the storing comprises, when a user command to reproduce by synchronizing the first multimedia data and the second multimedia data is input, storing the first multimedia data.

13. The receiving apparatus of claim 1, wherein the first time code and the second time code comprise a Society of Motion Picture and Television Engineers (SMPTE) time code.

14. The receiving apparatus of claim 1, wherein the first multimedia data comprises a multiplexed stream of a first packetized video Elementary Stream (ES) and a first additional ES constituting the first multimedia data using a Packetized Elementary Stream (PES) packetizer, one of a header of the first ES and a header of the first additional ES comprising the first time stamp information, and wherein the second multimedia data comprises a multiplexed stream of a second packetized video Elementary Stream (ES) and a second additional ES constituting the second multimedia data using a Packetized Elementary Stream (PES) packetizer, one of a header of the second ES and a header of the second additional ES comprising the second time stamp information.

15. The method of claim 7, wherein the first time code and the second time code comprise a Society of Motion Picture and Television Engineers (SMPTE) time code.

16. The method of claim 7, wherein the first multimedia data comprises a multiplexed stream of a first packetized video Elementary Stream (ES) and a first additional ES constituting the first multimedia data using a Packetized Elementary Stream (PES) packetizer, one of a header of the first ES and a header of the first additional ES comprising the first time stamp information, and wherein the second multimedia data comprises a multiplexed stream of a second packetized video Elementary Stream (ES) and a second additional ES constituting the second multimedia data using a Packetized Elementary Stream (PES) packetizer, one of a header of the second ES and a header of the second additional ES comprising the second time stamp information.

* * * * *